(12) United States Patent
Jung et al.

(10) Patent No.: US 10,004,047 B2
(45) Date of Patent: Jun. 19, 2018

(54) METHOD FOR PERFORMING POWER CONTROL FOR UPLINK TRANSMISSION AND USER EQUIPMENT

(71) Applicant: LG ELECTRONICS INC., Seoul (KR)

(72) Inventors: Manyoung Jung, Seoul (KR); Yoonoh Yang, Seoul (KR); Sangwook Lee, Seoul (KR); Suhwan Lim, Seoul (KR); Jinyup Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days. days.

(21) Appl. No.: 15/126,573

(22) PCT Filed: Mar. 25, 2015

(86) PCT No.: PCT/KR2015/002902
§ 371 (c)(1),
(2) Date: Sep. 15, 2016

(87) PCT Pub. No.: WO2015/147539
PCT Pub. Date: Oct. 1, 2015

(65) Prior Publication Data
US 2017/0086148 A1 Mar. 23, 2017

Related U.S. Application Data

(60) Provisional application No. 61/971,535, filed on Mar. 28, 2014.

(51) Int. Cl.
*H04W 52/26* (2009.01)
*H04W 52/14* (2009.01)

(52) U.S. Cl.
CPC ....... *H04W 52/262* (2013.01); *H04W 52/146* (2013.01)

(58) Field of Classification Search
None
See application file for complete search history.

(56) References Cited

U.S. PATENT DOCUMENTS

2009/0075659 A1  3/2009  Lee et al.
2009/0170509 A1* 7/2009  Cai .................. H04L 1/0003
                                          455/434
(Continued)

FOREIGN PATENT DOCUMENTS

KR    1020090028896 A    3/2009
KR    1020090030781 A    3/2009
(Continued)

*Primary Examiner* — Diane Lo
(74) *Attorney, Agent, or Firm* — Lee Hong Degerman Kang Waimey

(57) ABSTRACT

One embodiment of the present specification discloses a method for performing power control for an uplink transmission in user equipment. The method comprises the steps of: receiving a signal including information about a maximum modulation order among modulation schemes of a low order that can be used for an uplink transmission; comparing the modulation order set to be used for an uplink transmission with the modulation order included in the signal; and setting a transmission radio frequency (RF) unit into a first power mode if the modulation order set to be used for an uplink transmission is lower than or equal to the modulation order included in the signal.

6 Claims, 12 Drawing Sheets

(56) References Cited

U.S. PATENT DOCUMENTS

| | | | |
|---|---|---|---|
| 2010/0296567 A1* | 11/2010 | Qiu | H04B 1/109 |
| | | | 375/227 |
| 2011/0317606 A1 | 12/2011 | Osterling et al. | |
| 2012/0088510 A1 | 4/2012 | Akhi et al. | |
| 2013/0244717 A1* | 9/2013 | Adachi | H04L 1/0003 |
| | | | 455/522 |
| 2015/0085767 A1* | 3/2015 | Einhaus | H04L 1/0001 |
| | | | 370/329 |

FOREIGN PATENT DOCUMENTS

| | | |
|---|---|---|
| KR | 1020130079551 A | 7/2013 |
| WO | 2009038435 A2 | 3/2009 |

* cited by examiner

METHOD FOR PERFORMING POWER CONTROL FOR UPLINK TRANSMISSION AND USER EQUIPMENT

CROSS-REFERENCE TO RELATED APPLICATIONS

This application is the National Stage filing under 35 U.S.C. 371 of International Application No. PCT/KR2015/002902, filed on Mar. 25, 2015, which claims the benefit of U.S. Provisional Application No. 61/971,535, filed on Mar. 28, 2014, the contents of which are all hereby incorporated by reference herein in their entirety.

BACKGROUND OF THE INVENTION

Field of the Invention

The present invention relates to mobile communication.

Related Art

3rd generation partnership project (3GPP) long term evolution (LTE) evolved from a universal mobile telecommunications system (UMTS) is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) evolved from the 3GPP LTE.

As disclosed in 3GPP TS 36.211 V10.4.0 (2011-12) "Evolved Universal Terrestrial Radio Access (E-UTRA); Physical Channels and Modulation (Release 10)", a physical channel of LTE may be classified into a downlink channel, i.e., a PDSCH (Physical Downlink Shared Channel) and a PDCCH (Physical Downlink Control Channel), and an uplink channel, i.e., a PUSCH (Physical Uplink Shared Channel) and a PUCCH (Physical Uplink Control Channel).

Meanwhile, in a next-generation mobile communication system, it is expected that a small cell having a small cell coverage radius is added within a coverage of a macro cell.

In addition, a next-generation mobile communication system may be improved to use a high order modulation scheme, e.g., 256 quadrature amplitude modulation (QAM), in comparison with a small cell.

In order for a terminal to perform transmission by using the 256QAM modulation scheme, an error vector magnitude (EVM) must be significantly low. In this case, a dynamic range of a radio frequency (RF) element of the terminal must be increased to decrease the EVM, which causes an increase in power consumption and an increase in a battery consumption amount.

SUMMARY OF THE INVENTION

Accordingly, an object of the present invention is to solve the above-mentioned problems.

In order to achieve the aforementioned object, one disclosure of the present specification proposes a method of decreasing power consumption when a modulation scheme lower than 256QAM is used, as a solution for a problem in which a battery consumption amount is increased in proportion to an increase in power consumption when a user equipment performs uplink transmission through a 256QAM modulation scheme.

More specifically, in order to achieve the aforementioned object, one disclosure of the present specification provides a method of performing power control for uplink transmission in a user equipment. The method may include: receiving a signal containing information about a maximum modulation order among modulation schemes of which an order is lower than an order of a first reference modulation scheme among modulation schemes that can be used for uplink transmission; comparing the modulation order set to be used for the uplink transmission with the modulation order contained in the signal; and if the modulation order set to be used for the uplink transmission is lower than or equal to the modulation order contained in the signal, setting a transmission radio frequency (RF) unit to a first power mode.

The method may further include: if the modulation order set to be used for the uplink transmission is greater than the modulation order contained in the signal, setting the transmitting RF unit to a second power mode.

The first power mode may be a mode in which a high error vector magnitude (EVM) is allowed since quality of a first level is required, and power consumption is low since a low dynamic range is allowed. The second power mode may be a mode in which a low EVM is necessary since quality of a second level is required, and thus great power consumption is necessary since a high dynamic range is required.

The information regarding the maximum modulation order may be common to all user equipments in a cell, or may be different for each user equipment.

The information regarding the maximum modulation order may have a 2-bit length, and may indicate QPSK if a bit value is 00, 16QAM if the value is 01, 64QAM if the value is 10, and 256QAM if the value is 11.

In order to achieve the aforementioned object, one disclosure of the present specification proposes a user equipment for performing power control for uplink transmission. The user equipment may include: an RF unit set to any one of a first power mode and a second power mode, and a processor that is configured to perform: receiving a signal containing information through the RF unit about a maximum modulation order among modulation schemes of which an order is lower than an order of a first reference modulation scheme among modulation schemes that can be used for uplink transmission; comparing the modulation order set to be used for the uplink transmission with the modulation order contained in the signal; and if the modulation order set to be used for the uplink transmission is lower than or equal to the modulation order contained in the signal, setting a transmission RF unit to a first power mode.

According to a disclosure of the present specification, the aforementioned conventional technical problem is solved.

DESCRIPTION OF EXEMPLARY EMBODIMENTS

Figure 1:
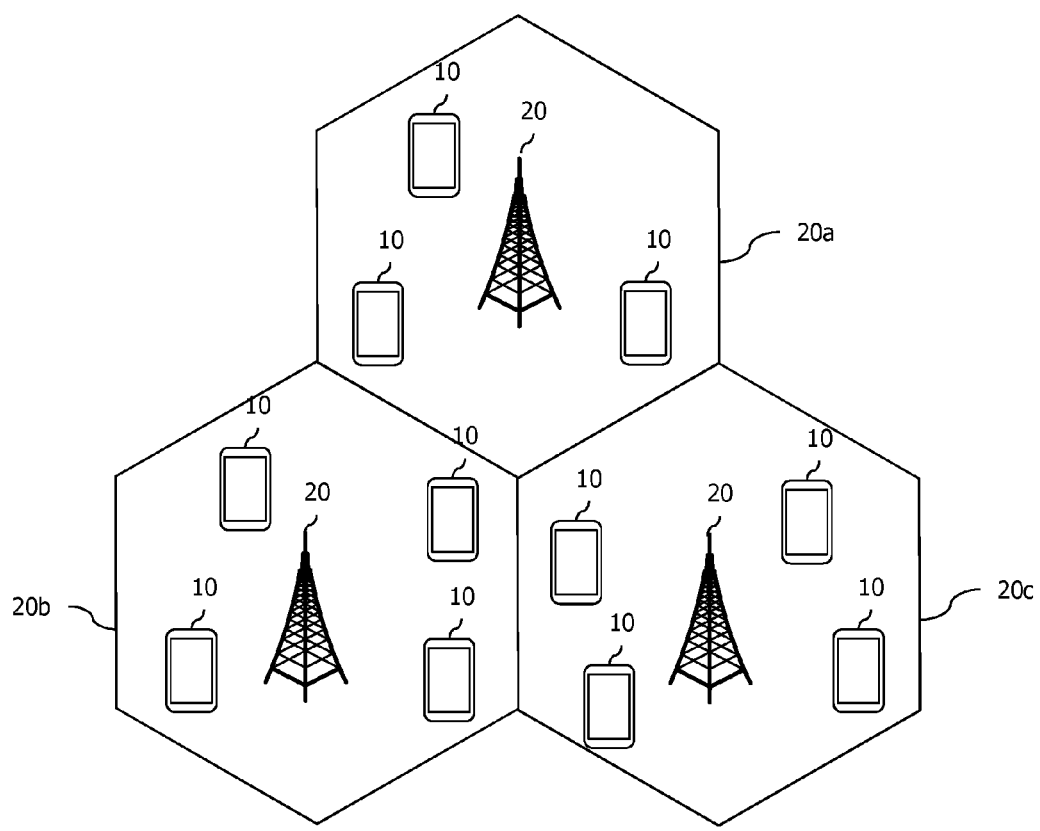
FIG. 1 is a wireless communication system.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present invention includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present invention, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, 'user equipment (UE)' may be stationary or mobile, and may be denoted by other terms such as device, wireless device, terminal, MS (mobile station), UT (user terminal), SS (subscriber station), MT (mobile terminal) and etc.

FIG. 1 Illustrates a Wireless Communication System.

As seen with reference to FIG. 1, the wireless communication system includes at least one base station (BS) 20. Each base station 20 provides a communication service to specific geographical areas (generally, referred to as cells) 20*a*, 20*b*, and 20*c*. The cell can be further divided into a plurality of areas (sectors).

The UE generally belongs to one cell and the cell to which the UE belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the UE 10 and an uplink means communication from the UE 10 to the base station 20. In the downlink, a transmitter may be a part of the base station 20 and a receiver may be a part of the UE 10. In the uplink, the transmitter may be a part of the UE 10 and the receiver may be a part of the base station 20.

Hereinafter, the LTE system will be described in detail.

Figure 2:
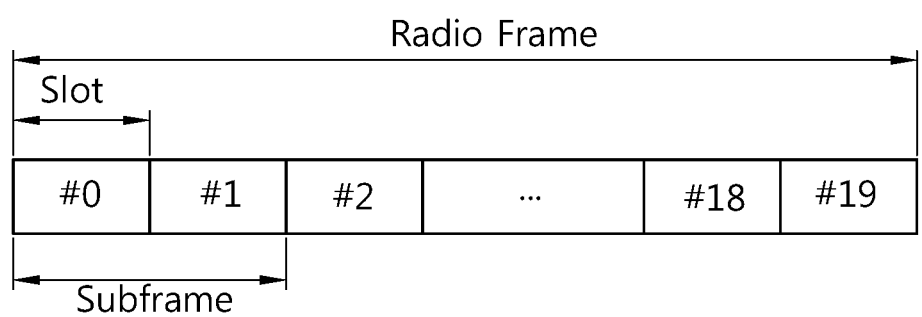
FIG. 2 illustrates a structure of a radio frame according to FDD in 3GPP LTE.

FIG. 2 Shows a Downlink Radio Frame Structure According to FDD of 3rd Generation Partnership Project (3GPP) Long Term Evolution (LTE).

The radio frame of FIG. 2 may be found in the section 5 of 3GPP TS 36.211 V10.4.0 (2011-12) "Evolved Universal Terrestrial Radio Access (E-UTRA); Physical Channels and Modulation (Release 10)".

The radio frame includes 10 sub-frames indexed 0 to 9. One sub-frame includes two consecutive slots. Accordingly, the radio frame includes 20 slots. The time taken for one sub-frame to be transmitted is denoted TTI (transmission time interval). For example, the length of one sub-frame may be 1 ms, and the length of one slot may be 0.5 ms.

The structure of the radio frame is for exemplary purposes only, and thus the number of sub-frames included in the radio frame or the number of slots included in the sub-frame may change variously.

Meanwhile, one slot may include a plurality of OFDM symbols. The number of OFDM symbols included in one slot may vary depending on a cyclic prefix (CP).

Figure 3:
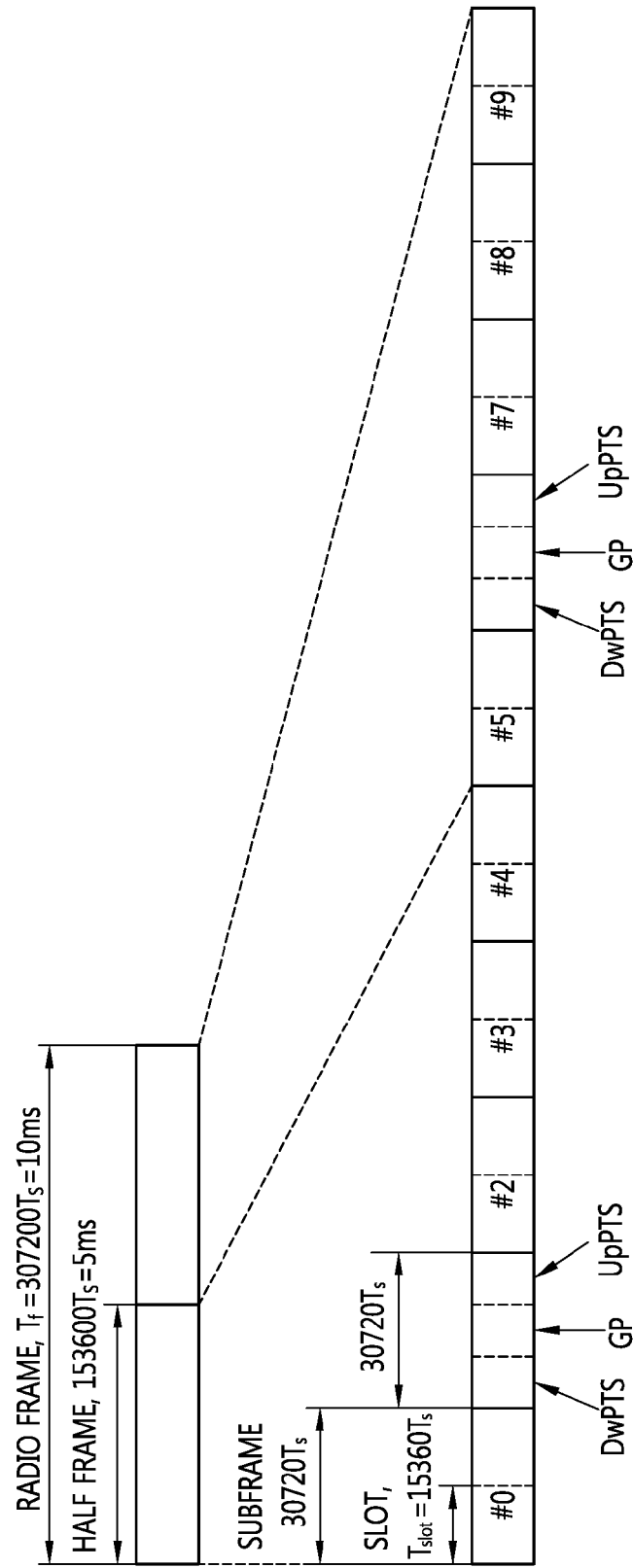
FIG. 3 illustrates a structure of a downlink radio frame according to TDD in the 3GPP LTE.

FIG. 3 Illustrates the Architecture of a Downlink Radio Frame According to TDD in 3GPP LTE.

For this, 3GPP TS 36.211 V10.4.0 (2011-23) "Evolved Universal Terrestrial Radio Access (E-UTRA); Physical Channels and Modulation (Release 8)", Ch. 4 may be referenced, and this is for TDD (time division duplex).

Sub-frames having index #1 and index #6 are denoted special sub-frames, and include a DwPTS (Downlink Pilot Time Slot: DwPTS), a GP (Guard Period) and an UpPTS (Uplink Pilot Time Slot). The DwPTS is used for initial cell search, synchronization, or channel estimation in a terminal. The UpPTS is used for channel estimation in the base station and for establishing uplink transmission sync of the terminal. The GP is a period for removing interference that arises on uplink due to a multi-path delay of a downlink signal between uplink and downlink.

In TDD, a DL (downlink) sub-frame and a UL (Uplink) co-exist in one radio frame. Table 1 shows an example of configuration of a radio frame.

TABLE 1

| UL-DL configuration | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

'D' denotes a DL sub-frame,
'U' a UL sub-frame, and
'S' a special sub-frame.

When receiving a UL-DL configuration from the base station, the terminal may be aware of whether a sub-frame is a DL sub-frame or a UL sub-frame according to the configuration of the radio frame.

TABLE 2

| | Normal CP in downlink | | | Extended CP in downlink | | |
|---|---|---|---|---|---|---|
| | | UpPTS | | | UpPTS | |
| Special subframe configuration | DwPTS | Normal CP in uplink | Extended CP in uplink | DwPTS | Normal CP in uplink | Extended CP in uplink |
| 0 | 6592 * Ts | 2192 * Ts | 2560 * Ts | 7680 * Ts | 2192 * Ts | 2560 * Ts |
| 1 | 19760 * Ts | | | 20480 * Ts | | |
| 2 | 21952 * Ts | | | 23040 * Ts | | |
| 3 | 24144 * Ts | | | 25600 * Ts | | |
| 4 | 26336 * Ts | | | 7680 * Ts | | |
| 5 | 6592 * Ts | 4384 * Ts | 5120 * ts | 20480 * Ts | 4384 * Ts | 5120 * ts |
| 6 | 19760 * Ts | | | 23040 * Ts | | |
| 7 | 21952 * Ts | | | — | | |
| 8 | 24144 * Ts | | | — | | |

Figure 4:
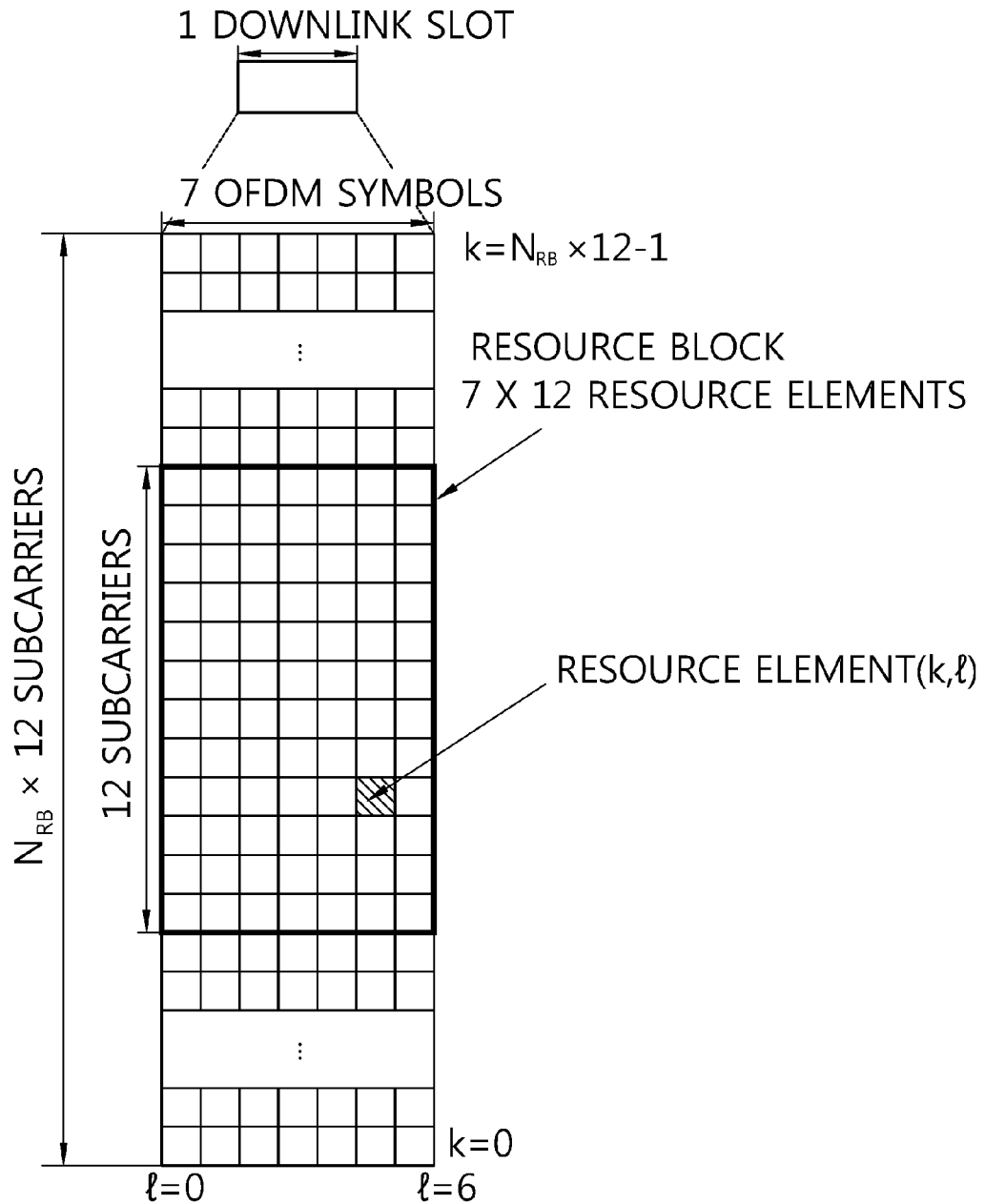
FIG. 4 is an exemplary diagram illustrating a resource grid for one uplink or downlink slot in the 3GPP LTE.

FIG. 4 Illustrates an Example Resource Grid for One Uplink or Downlink Slot in 3GPP LTE.

Referring to FIG. 4, the uplink slot includes a plurality of OFDM (orthogonal frequency division multiplexing) symbols in the time domain and NRB resource blocks (RBs) in the frequency domain. For example, in the LTE system, the number of resource blocks (RBs), i.e., NRB, may be one from 6 to 110.

The resource block is a unit of resource allocation and includes a plurality of sub-carriers in the frequency domain. For example, if one slot includes seven OFDM symbols in the time domain and the resource block includes 12 sub-carriers in the frequency domain, one resource block may include 7×12 resource elements (REs).

Meanwhile, the number of sub-carriers in one OFDM symbol may be one of 128, 256, 512, 1024, 1536, and 2048.

In 3GPP LTE, the resource grid for one uplink slot shown in FIG. 4 may also apply to the resource grid for the downlink slot.

Figure 5:
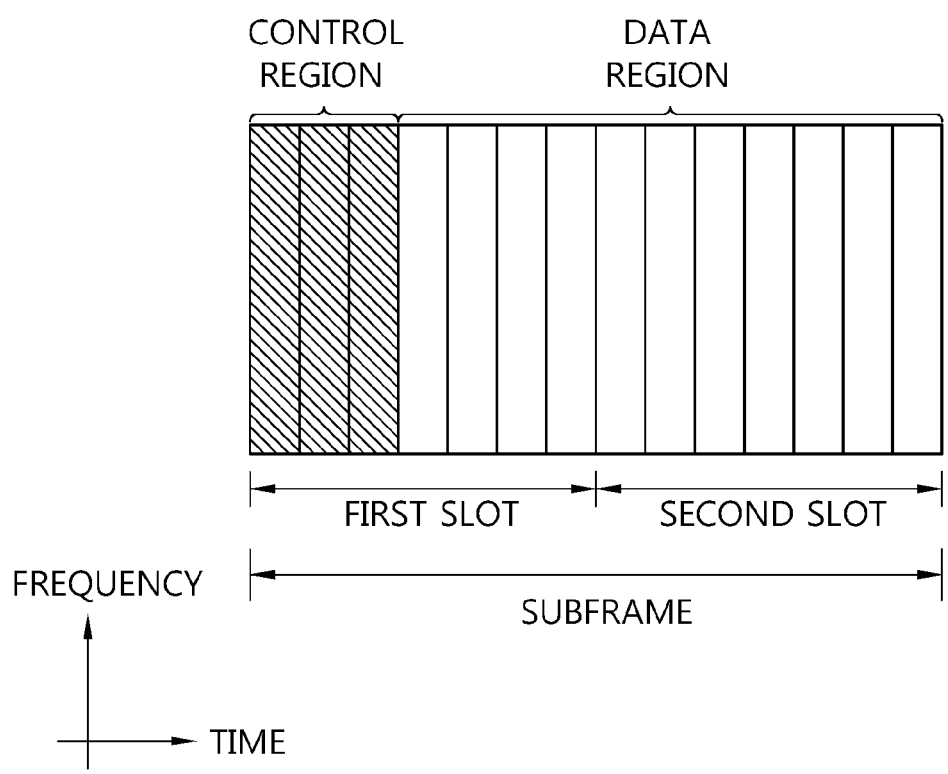
FIG. 5 illustrates a structure of a downlink subframe.

FIG. 5 Illustrates the Architecture of a Downlink Sub-frame.

In FIG. 5, assuming the normal CP, one slot includes seven OFDM symbols, by way of example.

The DL (downlink) sub-frame is split into a control region and a data region in the time domain. The control region includes up to first three OFDM symbols in the first slot of the sub-frame. However, the number of OFDM symbols included in the control region may be changed. A PDCCH (physical downlink control channel) and other control channels are assigned to the control region, and a PDSCH is assigned to the data region.

The physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The PCFICH transmitted in the first OFDM symbol of the sub-frame carries CIF (control format indicator) regarding the number (i.e., size of the control region) of OFDM symbols used for transmission of control channels in the sub-frame. The wireless device first receives the CIF on the PCFICH and then monitors the PDCCH.

Unlike the PDCCH, the PCFICH is transmitted through a fixed PCFICH resource in the sub-frame without using blind decoding. The PHICH carries an ACK (positive-acknowledgement)/NACK (negative-acknowledgement) signal for a UL HARQ (hybrid automatic repeat request). The ACK/NACK signal for UL (uplink) data on the PUSCH transmitted by the wireless device is sent on the PHICH.

The PBCH (physical broadcast channel) is transmitted in the first four OFDM symbols in the second slot of the first sub-frame of the radio frame. The PBCH carries system information necessary for the wireless device to communicate with the base station, and the system information transmitted through the PBCH is denoted MIB (master information block). In comparison, system information transmitted on the PDSCH indicated by the PDCCH is denoted SIB (system information block).

The PDCCH may carry activation of VoIP (voice over internet protocol) and a set of transmission power control commands for individual UEs in some UE group, resource allocation of an upper layer control message such as a random access response transmitted on the PDSCH, system information on DL-SCH, paging information on PCH, resource allocation information of UL-SCH (uplink shared channel), and resource allocation and transmission format of DL-SCH (downlink-shared channel). A plurality of PDCCHs may be sent in the control region, and the terminal may monitor the plurality of PDCCHs. The PDCCH is transmitted on one CCE (control channel element) or aggregation of some consecutive CCEs. The CCE is a logical allocation unit used for providing a coding rate per radio channel's state to the PDCCH. The CCE corresponds to a plurality of resource element groups. Depending on the relationship between the number of CCEs and coding rates provided by the CCEs, the format of the PDCCH and the possible number of PDCCHs are determined.

Control information transmitted through the PDCCH is referred to as downlink control information (DCI). The DCI may include resource allocation of the PDSCH (this is referred to as a DL grant), resource allocation of a PUSCH (this is referred to as a UL grant), a set of transmit power control commands for individual UEs in any UE group, and/or activation of a voice over Internet protocol (VoIP).

The base station determines a PDCCH format according to the DCI to be sent to the terminal and adds a CRC (cyclic redundancy check) to control information. The CRC is masked with a unique identifier (RNTI; radio network temporary identifier) depending on the owner or purpose of the PDCCH. In case the PDCCH is for a specific terminal, the terminal's unique identifier, such as C-RNTI (cell-RNTI), may be masked to the CRC. Or, if the PDCCH is for a paging message, a paging indicator, for example, P-RNTI (paging-RNTI) may be masked to the CRC. If the PDCCH is for a system information block (SIB), a system information identifier, SI-RNTI (system information-RNTI), may be masked to the CRC. In order to indicate a random access response that is a response to the terminal's transmission of a random access preamble, an RA-RNTI (random access-RNTI) may be masked to the CRC.

In 3GPP LTE, blind decoding is used for detecting a PDCCH. The blind decoding is a scheme of identifying whether a PDCCH is its own control channel by demasking a desired identifier to the CRC (cyclic redundancy check) of a received PDCCH (this is referred to as candidate PDCCH) and checking a CRC error. The base station determines a PDCCH format according to the DCI to be sent to the wireless device, then adds a CRC to the DCI, and masks a unique identifier (this is referred to as RNTI (radio network temporary identifier) to the CRC depending on the owner or purpose of the PDCCH.

The uplink channels include a PUSCH, a PUCCH, an SRS (Sounding Reference Signal), and a PRACH (physical random access channel).

Figure 6:
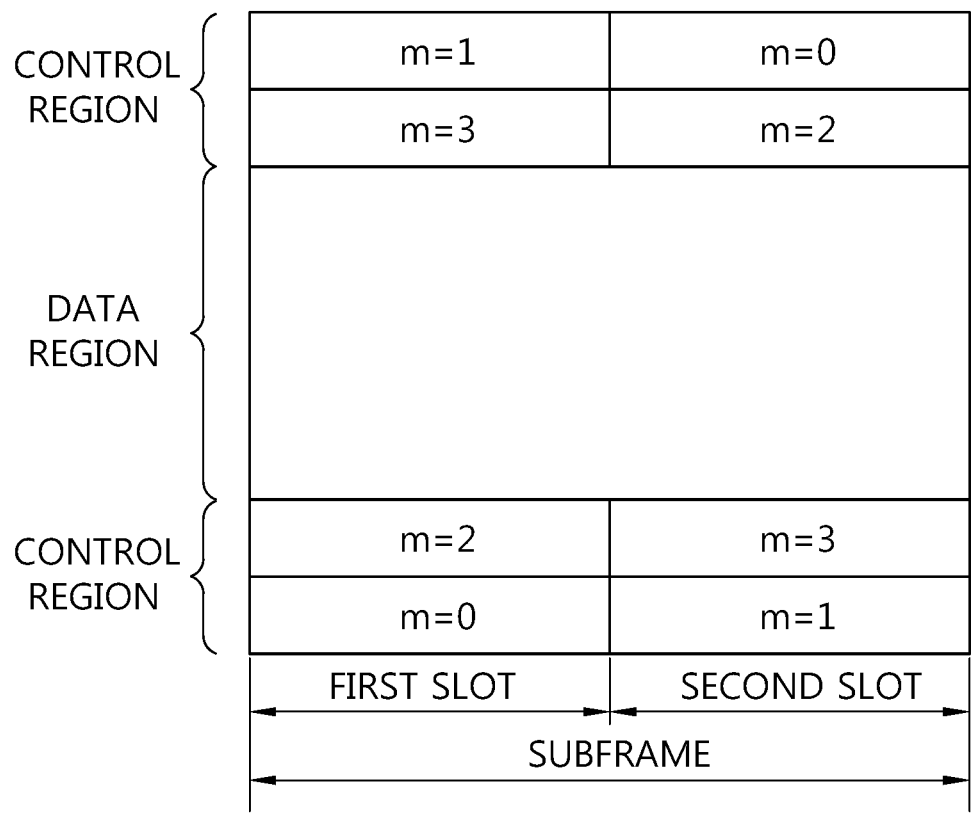
FIG. 6. illustrates a structure of an uplink subframe in 3GPP LTE.
Figure 6:
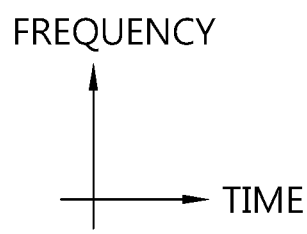

FIG. 6 Illustrates the Architecture of an Uplink Sub-frame in 3GPP LTE.

Referring to FIG. 6, the uplink sub-frame may be separated into a control region and a data region in the frequency domain. The control region is assigned a PUCCH (physical uplink control channel) for transmission of uplink control information. The data region is assigned a PUSCH (physical uplink shared channel) for transmission of data (in some cases, control information may also be transmitted).

The PUCCH for one terminal is assigned in resource block (RB) pair in the sub-frame. The resource blocks in the resource block pair take up different sub-carriers in each of the first and second slots. The frequency occupied by the resource blocks in the resource block pair assigned to the PUCCH is varied with respect to a slot boundary. This is referred to as the RB pair assigned to the PUCCH having been frequency-hopped at the slot boundary.

The terminal may obtain a frequency diversity gain by transmitting uplink control information through different sub-carriers over time. m is a location index that indicates a logical frequency domain location of a resource block pair assigned to the PUCCH in the sub-frame.

The uplink control information transmitted on the PUCCH includes an HARQ (hybrid automatic repeat request), an ACK (acknowledgement)/NACK (non-acknowledgement), a CQI (channel quality indicator) indicating a downlink channel state, and an SR (scheduling request) that is an uplink radio resource allocation request.

The PUSCH is mapped with a UL-SCH that is a transport channel. The uplink data transmitted on the PUSCH may be a transport block that is a data block for the UL-SCH transmitted for the TTI. The transport block may be user information. Or, the uplink data may be multiplexed data. The multiplexed data may be data obtained by multiplexing the transport block for the UL-SCH and control information. For example, the control information multiplexed with the data may include a CQI, a PMI (precoding matrix indicator), an HARQ, and an RI (rank indicator). Or, the uplink data may consist only of control information.

<Carrier Aggregation (CA)>

A carrier aggregation system is described hereinafter.

A carrier aggregation system aggregates a plurality of component carriers (CCs). A conventional definition of a cell is changed according to carrier aggregation. According to carrier aggregation, a cell may denote a combination of a downlink component carrier and an uplink component carrier or a downlink component carrier alone.

Further, in carrier aggregation, cells may be divided into a primary cell, a secondary cell, and a serving cell. A primary cell denotes a cell operating at a primary frequency, in which a UE performs an initial connection establishment procedure or a connection reestablishment procedure with a BS or which is designated as a primary cell in a handover procedure. A secondary cell denotes a cell operating at a secondary frequency, which is configured once RRC connection is established and is used to provide an additional radio resource.

Carrier aggregation systems may be divided into a contiguous carrier aggregation system in which aggregated carriers are contiguous and a non-contiguous carrier aggregation system in which aggregated carriers are spaced apart from each other. Hereinafter, when simply referring to a carrier aggregation system, it should be understood as including both a case where component carriers are contiguous and a case where component carriers are non-contiguous. Different numbers of component carriers may be aggregated for a downlink and an uplink. A case where the number of downlink component carriers and the number of uplink component carriers are the same is referred to as symmetric aggregation, and a case where the numbers are different is referred to as asymmetric aggregation.

When one or more component carriers are aggregated, component carriers to be aggregated may use the same bandwidths as adopted in an existing system for backward compatibility with the existing system. For example, the 3GPP LTE system supports bandwidths of 1.4 MHz, 3 MHz, 5 MHz, 10 MHz, 15 MHz, and 20 MHz, and the 3GPP LTE-A system may configure a broad band of 20 MHz or more only using the bandwidths of the 3GPP LTE system.

Alternatively, instead of using the bandwidths of the existing system, new bandwidths may be defined to configure a broad band.

In order to transmit/receive packet data through a specific secondary cell in carrier aggregation, a UE first needs to complete configuration for the specific secondary cell. Here, configuration means that reception of system information necessary for data transmission/reception in a cell is completed. For example, configuration may include an overall process of receiving common physical-layer parameters necessary for data transmission and reception, media access control (MAC)-layer parameters, or parameters necessary for a specific operation in an RRC layer. A configuration-completed cell is in a state where packet transmission and reception is immediately possible upon receiving information indicating packet data may be transmitted.

A configuration-completed cell may be in an activated or deactivated state. Here, the activated state means that the cell performs data transmission or reception or is ready for data transmission or reception. A UE may monitor or receive a control channel (PDCCH) and a data channel (PDSCH) of an activated cell in order to identify resources (which may be a frequency or time) assigned thereto.

The deactivated state means that transmission or reception of traffic data is impossible and measurement or transmission/reception of minimal information is possible. A UE may receive system information (SI) necessary for receiving a packet from a deactivated cell. However, the UE does not monitor or receive a control channel (PDCCH) and data channel (PDSCH) of the deactivated cell in order to identify resources (which may be a frequency or time) assigned thereto.

<Introduction of Small Cell>

Meanwhile, in a next-generation mobile communication system, it is expected that a small cell having a small cell coverage radius is added in the coverage of a legacy cell and that the small cell handles a greater amount of traffic. The legacy cell has a greater coverage than that of the small cell, and thus is also referred to as a macro cell, which is described with reference to FIG. 7.

Figure 7:
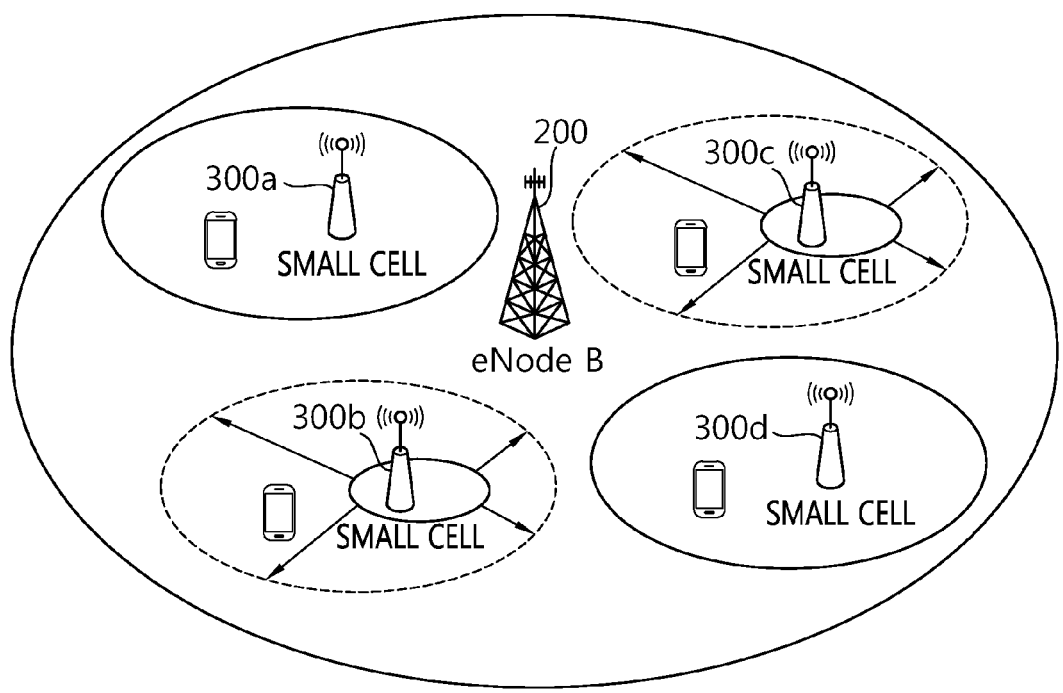
FIG. 7 illustrates a heterogeneous network environment in which a macro cell and a small cell coexist and which is possibly used in a next-generation wireless communication system.

FIG. 7 Illustrates a Heterogeneous Network Environment in which a Macro Cell and a Small Cell Coexist and which is Possibly Used in a Next-generation Wireless Communication System.

FIG. 7 shows a heterogeneous network environment in which a macro cell of a legacy BS 200 overlaps with one or more small cells of small BSs 300a, 300b, 300c, and 300d. The legacy BS provides a greater coverage than the small BSs and thus is also referred to as a macro BS (macro eNodeB (MeNB)). In the present specification, the macro cell and the MeNB may be used together. A UE having access to the macro cell 200 may be referred to as a macro UE. The macro UE receives a downlink signal from the MeNB and transmits an uplink signal to the MeNB.

In this heterogeneous network, coverage holes of the macro cell may be filled by configuring the macro cell as a primary cell (Pcell) and by configuring the small cells as secondary cells (Scells). In addition, overall performance may be boosted by configuring the small cells as Pcells and by configuring the macro cell as a Scell.

<Introduction of 256 QAM>

In LTE/LTE-A, binary phase shift keying (BPSK), quadrature phase shift keying (QPSK), 16 quadrature amplitude modulation (QAM), and 64QAM are used as a modulation scheme. However, in a next-generation modulation communication system, a communication distance is further decreased due to an introduction of a small cell, and as a result, it is expected that a state of a wireless channel is further improved. Accordingly, in order to further maximize efficiency of the wireless channel, a high order modulation scheme, e.g., 256QAM, may be used.

However, an error vector magnitude (EVM) must be significantly low to support the 256QAM while guaranteeing a high SINR. More specifically, in order to support the 256QAM while guaranteeing the high SINR, an EVM of a base station (BS) must be decreased to be less than or equal to, for example, 3 to 4%, and an EVM of a user equipment (UE) must be decreased to be less than or equal to 6%.

The EVM for the legacy BS is defined in the 3GPP standard 36.104, and is defined, for convenience, in the following table.

TABLE 3

| Modulation scheme for PDSCH | Average EVM [%] |
|---|---|
| QPSK | 17.5% |
| 16QAM | 12.5% |
| 64QAM | 8% |
| 256QAM | 3.5% |

Referring to the above table, for the legacy BS, the EVM is required to be less than or equal to 17.5% in case of QPSK, and the EVM is required to be less than or equal to 12.5% in case of 16QAM. However, when the high order modulation scheme is used as described above, a required EVM is further increased to 8% in case of 64QAM and the EVM of the BS is decreased to be less than or equal to 3.5%. In addition, accordingly, an EVM of a UE corresponding to a receiver is also required to be decreased in the same manner. In case of 256QAM reception, a definition for a current capability standard is underway at present provisionally by considering a reception EVM of 3% instead of the conventional 6% EVM.

However, in order to satisfy such a low EVM requirement condition, an additional power backoff is necessary, and a radio frequency (RF) element is required to be improved to have a wide dynamic range. As a result, there is a problem in that an additional cost is generated, and power consumption is increased due to a decrease in power efficiency. From a perspective of the UE, the power consumption is a significant obstacle in terms of a decrease in a call time and a waiting time.

Figure 8:
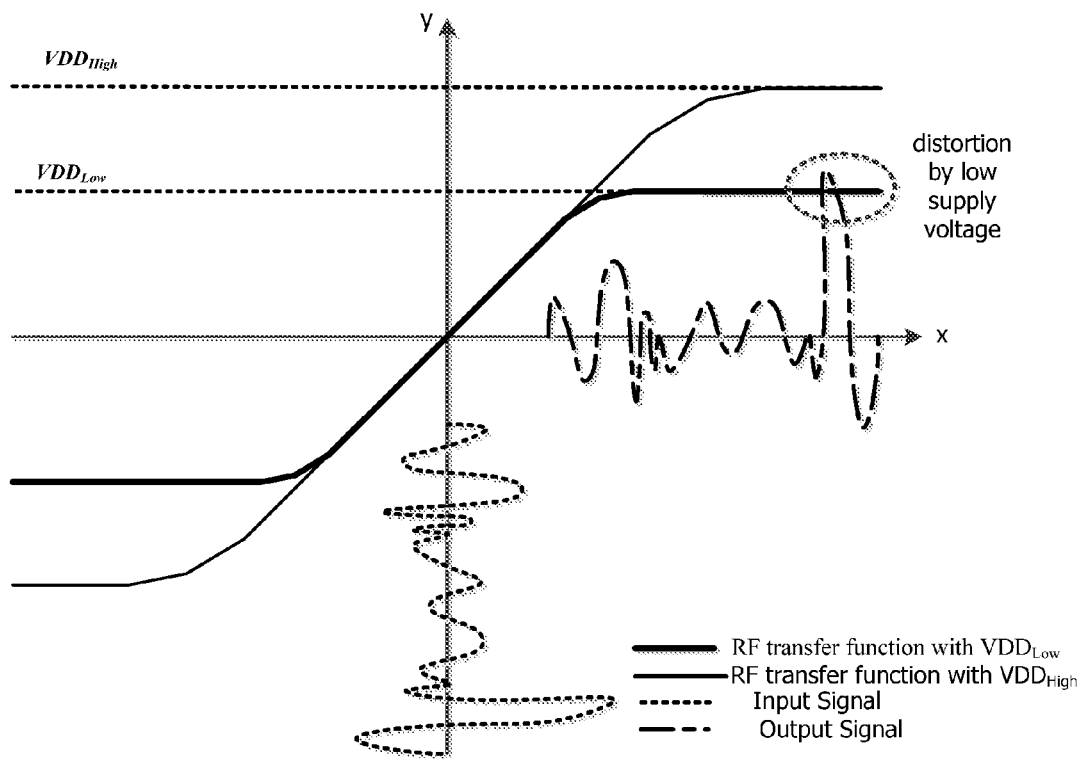
FIG. 8 illustrates an example of a relation between input/output signals based on setting of an operating reference voltage of an RF element.

FIG. 8 Illustrates an Example of a Relation between Input/Output Signals Based on Setting of an Operating Reference Voltage of an RF Element.

As can be seen from FIG. 8, if an operating reference voltage is low ($VDD_{Low}$) as to an input RF signal, an output signal exhibits nonlinearity in some regions due to a limited dynamic range, which results in a distortion in the signal. In addition, the distortion results in an increase in an EVM based on an RF element, thereby decreasing an SNR of the signal.

On the other hand, if the operating reference voltage is set to be high ($VDD_{High}$), the signal operates mostly in a linear region of the RF element due to an extended dynamic range, and thus a low EVM can be obtained. Such a characteristic may be more apparent in an OFDM modulation scheme having a greater peak to average power ratio (PAPR) of a reception signal.

By considering this, in general, the RF element is set to have a sufficient dynamic range by assuming the worst case at the expense of an increase in power consumption.

However, when the UE transmits/receives a signal requiring a lower SNR with a lower modulation scheme such as QPSK, even if the dynamic range of the RF element is increased, an effect on an output SNR against an input SNR is not significant.

However, even if the UE uses the lower modulation scheme such as QPSK, there is a conventional problem in that power consumption is increased since an operating reference voltage is set to be high in order for the RF element to have a sufficient dynamic range.

<Solution of the Present Specification>

Accordingly, an object of a disclosure of the present specification is to solve the aforementioned problem.

More specifically, the object of the disclosure of the present specification is to restrict unnecessary power consumption when a low modulation and coding scheme (MCS) is assigned to a user equipment (UE) so as to decrease power consumption of the UE, thereby obtaining an increase in a call time.

For this, the present specification allows a base station (BS) to explicitly or implicitly control quality required on a radio frequency (RF) unit of the UE.

According to one disclosure of the present specification, a mode of the RF unit of the UE is classified as follows.

First power mode (e.g., $Mode_L$): In this mode, a high EVM is allowed due to low quality, and power consumption is low since a low dynamic range is allowed.

Second power mode (e.g., $Mode_H$): In this mode, an EVM must be low since high quality is required, and thus great power consumption is necessary since a high dynamic range is required.

Meanwhile, two different methods will be described below from a perspective of a UE, that is, a method for uplink transmission (UE Tx) and a method for downlink reception (UE Rx).

I. Method of Performing Quality Control for Uplink Transmission of UE (i.e., UE Tx)

A BS of a serving cell configures a maximum MCS among MCSs or a maximum modulation order among modulation orders for low quality enough to cause no problem, and performs signaling on information regarding the configuration to a UE.

The signaling may be common signaling common to all UEs in a cell. Alternatively, the signaling may be dedicated signaling specific to an individual UE.

The signaling which is common to the all UEs in the cell may include an MCS or a modulation order as follows.

1) First, if a configuration for a maximum MCS among MCSs for low quality determined to be enough to cause no problem is signaled commonly to the all UEs in the cell, an example of the signaling is shown in the following table.

TABLE 4

PDSCH-ConfigCommon ::= SEQUENCE {
referenceSignalPower INTEGER (−60..50),
p-b INTEGER (0..3),
LowQmcs-r12 INTEGER (0...31), Optional
}

In the above table, LowQmcs denotes a maximum MCS among MCSs for low quality determined to be enough to cause no problem, and may indicate one value in the range of 0 to 31 as follows.

TABLE 5

| LowQmcs | modulation order | transport block size (TBS) index |
|---|---|---|
| 0 | 2 | 0 |
| 1 | 2 | 2 |
| 2 | 2 | 4 |
| 3 | 2 | 6 |
| 4 | 2 | 8 |
| 5 | 4 | 10 |
| 6 | 4 | 11 |
| 7 | 4 | 12 |
| 8 | 4 | 13 |
| 9 | 4 | 14 |
| 10 | 4 | 15 |
| 11 | 6 | 16 |
| 12 | 6 | 17 |
| 13 | 6 | 18 |
| 14 | 6 | 19 |
| 15 | 6 | 20 |
| 16 | 6 | 21 |
| 17 | 6 | 22 |
| 18 | 6 | 23 |
| 19 | 6 | 24 |
| 20 | 8 | 25 |
| 21 | 8 | 27 |
| 22 | 8 | 28 |
| 23 | 8 | 29 |
| 24 | 8 | 30 |
| 25 | 8 | 31 |
| 26 | 8 | 32 |
| 27 | 8 | 33 |
| 28 | reserved | |
| 29 | | |
| 30 | | |
| 31 | | |

In the above table, a modulation order 2 indicates QPSK, a modulation order 4 indicates 16QAM, a modulation order 6 indicates 64QAM, and a modulation order 8 indicates 256QAM.

2) Next, if configuration information for a maximum modulation order among modulation orders having low quality determined to be enough to cause no problem is signaled commonly to the all UEs in the cell, an example of the signaling is shown in the following table.

TABLE 6

PDSCH-ConfigCommon ::= SEQUENCE {
referenceSignalPower INTEGER (−60..50),
p-b INTEGER (0..3),
LowQmodScheme ENUMERATED {QPSK, 16QAM, 64QAM, 256QAM}, Optional
}

The configuration information for the maximum modulation order may be expressed by LowQmodScheme as shown in the above table. The LowQmodScheme has a length of 2 bits, and may imply QPSK when having a value 00, 16QAM when having a value 01, 64QAM when having a value 10, and 256QAM when having a value 11.

Figure 9:
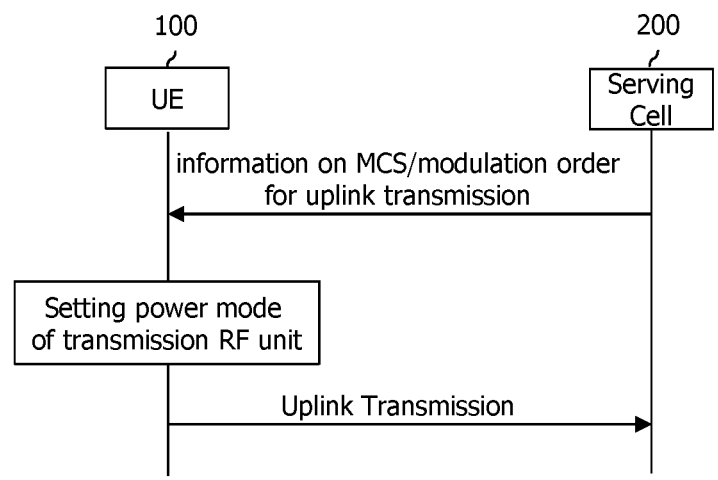
FIG. 9 illustrates an example of performing quality control for uplink transmission.

FIG. 9 Illustrates an Example of Performing Quality Control for Uplink Transmission.

As can be seen from FIG. 9, a BS of a serving cell may perform signaling on a configuration for a maximum MCS among MCSs for low quality determined to be enough to cause no problem or may perform signaling on a configuration for a maximum modulation order among modulation orders for low quality determined to be enough to cause no problem.

Meanwhile, when a UE receives the aforementioned signaling, the UE compares an MCS or modulation order determined by the UE as to an uplink signal to be transmitted and a value given in the received signaling. In this case, if the MCS or modulation order determined by the UE is lower than or equal to the value given in the signaling, an RF element is set to the aforementioned first power mode (e.g., ModeL). Meanwhile, transmission is performed. On the other hand, if the MCS or modulation order determined by the UE is higher than the value given in the signaling, the RF element is set to the second power mode (e.g., Mode$_H$).

Between the two types of signaling methods described above, given that a required EVM is closely related to a modulation order but is not much related to a coding rate in general and that efficiency is inverse proportional to the number of bits required for signaling, the method of signaling the configuration for the modulation order may be more efficient.

Meanwhile, an RF element setting may be extended to allow a multi-level setting, and in this case, signaling needs to be sufficiently extended as well.

Further, if the dedicated signaling is used in a UE-specific manner as described above, a BS can be configured to acquire different power efficiency for each UE. Such a situation may be more effective to a machine type communication (MTC) device requiring a low data size and requiring a long waiting time. For example, in a situation where power consumption of the MTC device is preferential and a delay time of data to be transmitted is not problematic, if the BS sets the MTC device to the first power mode (Mode$_L$) so that transmission is performed in a time duration in which cell loading is low, although a cell interference is increased due to a high EVM, there is no problem since the cell loading is low, and thus there is an advantage in that power consumption is saved. Accordingly, a relation between an interference amount and power consumption can be properly controlled in such a manner that the first power mode (Mode$_L$) is set to decrease power consumption of the UE when the cell loading is low and that the second power mode (Mode$_H$) is set to decrease a cell interference when the cell loading is high.

II. Method of Performing Quality Control for Downlink Reception of UE (i.e., UE Rx)

For convenience of explanation, a subframe of LTE/LTE-A is described as follows with reference to FIG. 10.

Figure 10:
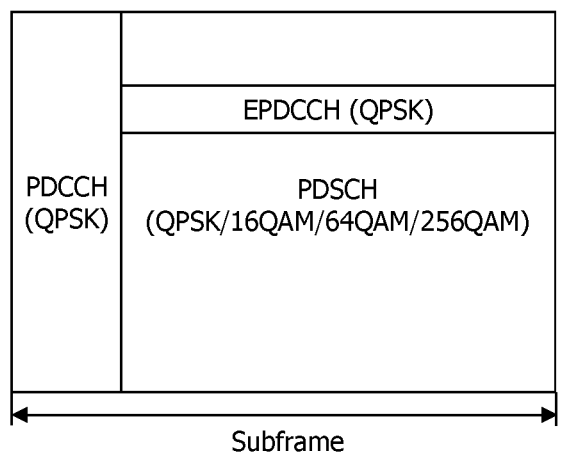
FIG. 10 illustrates an example of a downlink subframe based on LTE/LTE-A.

FIG. 10 Illustrates an Example of a Downlink Subframe Based on LTE/LTE-A.

Referring to FIG. 10, since a PDCCH/EPDCCH region uses a QPSK modulation scheme, there is no problem in reception even if an EVM is relatively higher. On the other hand, a PDSCH region has an EVM differently required by a modulation scheme based on an assigned MCS.

A method of performing quality control for downlink reception of a UE (i.e., UE Rx) may be described for two different cases where a BS performs downlink scheduling through a PDCCH and where the BS performs the downlink scheduling through an EPDCCH 1. Method of Performing Quality Control for Downlink Reception of UE (e.g., UE Rx) when BS Performs Downlink Scheduling through PDCCH According to the current LTE/LTE-A standard, a PCFICH designates the number of OFDM symbols for a PDCCH region. For example, if the number of downlink resource blocks (RBs) from a start of each subframe is less than or equal to 10, the PCFICH designates 2 to 4 OFDM symbols for the PDCCH region, and if it is greater than 10, the PCFICH designates 1 to 3 OFDM symbols for the PDCCH region. Meanwhile, DCI is included in the PDCCH. Therefore, a UE which supports quality control compares an MCS/modulation order detected through DCI information and a reference defined by considering an RF characteristic in advance, and in case of being less than or equal to that, sets a reception (Rx) RF element to a first power mode (e.g., Mode$_L$). On the other hand, if the MCS/modulation order detected through the DCI information is higher than the reference defined by considering the RF characteristic in advance, the UE sets a transmission (Tx) RF element to a second power mode (e.g., Mode$_H$). The quality-based setting of the RF element may be extended to allow a multi-level setting.

Such a method can be advantageously performed by the UE autonomously without the assistance of the BS, but disadvantageously cannot perform quality control by a time required for PDCCH decoding. Further, disadvantageously, this method cannot be applied when the BS performs downlink scheduling through an EPDCCH.

Figure 11:
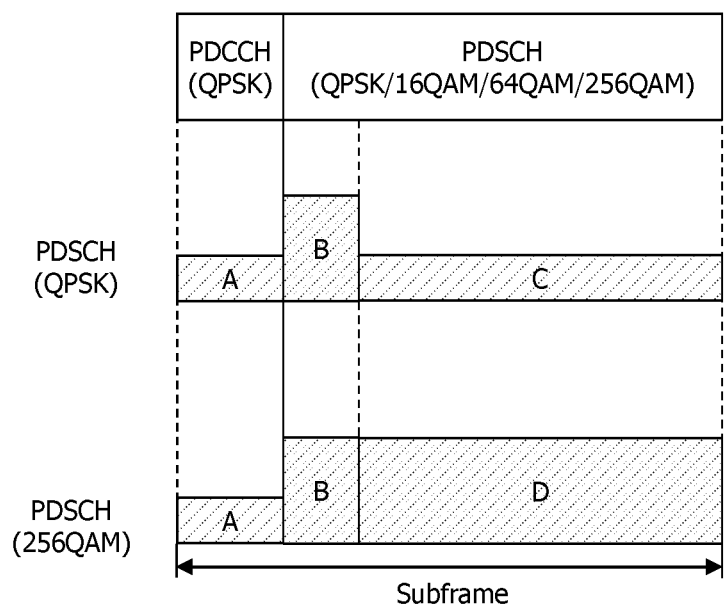
FIG. 11 illustrates an example of performing quality control for a PDSCH transmitted with QPSK and a PDSCH transmitted with 256QAM through a PDCCH.

FIG. 11 Illustrates an Example of Performing Quality Control for a PDSCH Transmitted with QPSK and a PDSCH Transmitted with 256QAM through a PDCCH.

Referring to FIG. 11, illustrated regions A, B, C, and D indicate regions in which quality of an RF element is controlled for reception of a UE, and a height of each region implies power consumed in an Rx RF element. The illustrated region A implies a region for receiving a PDCCH applied with a QPSK modulation scheme. In the region A, since low quality, that is, a low dynamic range, is allowed, the UE sets the Rx RF element to a first power mode (e.g., Mode$_L$) to save power consumption.

The illustrated region B implies a decoding time duration required to acquire DCI from the PDCCH. In the region B, since the UE cannot acquire information about an MCS/modulation order of the PDSCH, the RF element is set to a second power mode (e.g., Mode$_H$) by assuming the worst case.

In the region C, the UE recognizes that QPSK is applied to the PDSCH from DCI information of the PDCCH, and the Rx RF element is set to the first power mode (e.g., Mode$_L$) to decrease power consumption.

In the region D, the UE recognizes that 256QAM is applied to the PDSCH from the DCI information of the PDCCH, and the Rx RF element is set to the second power mode (e.g., Mode$_H$) to acquire low EVM capability at the expense of power consumption.

According to the above method, the UE can decrease power consumption by dynamically optimizing operating power consumption of the RF element as to a PDSCH region.

2. Method of Performing Quality Control for Downlink Reception of UE (i.e., UE Rx) when BS Performs Downlink Scheduling through EPDCCH First, since the EPDCCH is allocated to different resource blocks (RBs) of the same OFDM symbol in a subframe with respect to a PDSCH, quality/power consumption control of the RF element must be complete before reception of the EPDCCH. Accordingly, one embodiment proposes to additionally introduce an indicator channel of a physical channel. The indicator channel may also be called, for example, a physical downlink quality indicator channel (PDQICH). The indicator channel is transmitted with minimum information in a first OFDM symbol of each subframe, and a corresponding UE performs quality control on a data region (PDSCH and EPDCCH) on the basis of quality information received from the indicator channel, so that power consumption is decreased in an Rx RF element. For example, the quality information in the indicator channel may have a length of 1 bit, and may indicate low quality if a value of the bit is 0, and may indicate high quality if the value of the bit is 1. Therefore, the UE may set the Rx RF element to a first power mode (Mode$_L$) when the quality information acquired from the indicator channel, e.g., PDQICH, has a value 0, and may set the Rx RF element to a second power mode (Mode$_H$) when the quality information has a value 1, thereby optimizing power consumed in the Rx RF element.

Alternatively, the quality information can be transmitted from additional information of another channel other than the physical downlink quality indicator channel (PDQICH). For example, the quality information may be transmitted by being included in a physical HARQ indicator channel (PHICH). More specifically, as a channel for reporting uplink HARQ to the UE, the PHICH is received on a first OFDM symbol of each subframe.

Since one PHICH can transmit a plurality of HARQ indicators, a specific HARQ indicator among them can be used to indicate the quality information. In this case, all UEs in a cell capable of performing RF quality control may set the RF element to the first power mode (e.g., Mode$_L$) upon detection of the specific HARQ indicator, and may set the RF element to the second power mode (e.g., Mode$_H$) upon non-detection of the specific HARQ indicator, thereby optimizing power consumption of the Rx RF element.

Such a method can handle up to a case where the BS performs scheduling on the PDSCH through the EPDCCH, and can also handle a decoding processing duration based on the PDCCH. On the other hand, this method is not a method of performing quality control on an individual UE but a method of performing quality control on all cells, and disadvantageously, is not effective to a UE for receiving a QPSK-based PDSCH on the same subframe as the 256QAM-based subframe.

As described above, quality control is properly performed on the Rx RF element to achieve an increase in power efficiency of the UE while satisfying a required EVM/SNR condition, and thus also to achieve an increase in a call/waiting time.

The aforementioned embodiments of the present invention can be implemented through various means. For example, the embodiments of the present invention can be implemented in hardware, firmware, software, combination of them, etc. Details thereof will be described with reference to the drawing.

Figure 12:
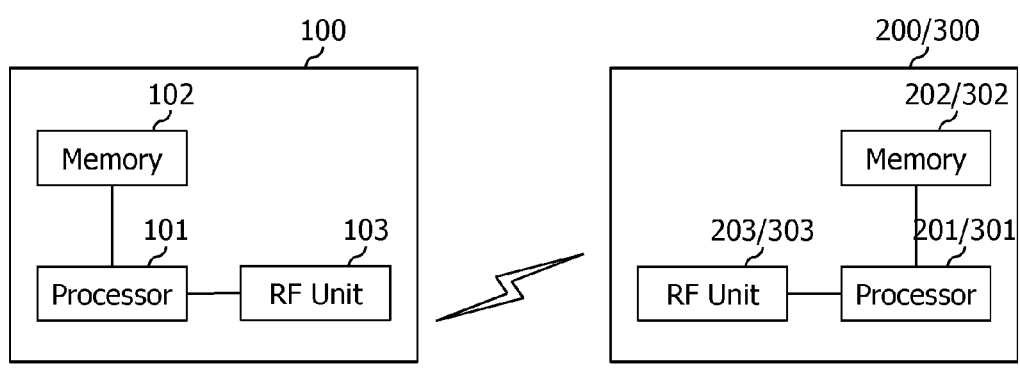
FIG. 12 is a block diagram illustrating a wireless communication system according to a disclosure of the present specification.

FIG. 12 is a Block Diagram Illustrating a Wireless Communication System According to a Disclosure of the Present Specification.

A BS 200/300 includes a processor 201/301, a memory 202/302, and a radio frequency (RF) unit 203/303. The memory 202/302 is coupled to the processor 201/301, and stores a variety of information for driving the processor 201/301. The RF unit 203/303 is coupled to the processor 201/301, and transmits and/or receives a radio signal. The processor 201/301 implements the proposed functions, procedures, and/or methods. In the aforementioned embodiment, an operation of the BS may be implemented by the processor 201/301.

A UE 100 includes a processor 101, a memory 102, and an RF unit 103. The memory 102 is coupled to the processor 101, and stores a variety of information for driving the processor 101. The RF unit 103 is coupled to the processor 101, and transmits and/or receives a radio signal. The processor 101 implements the proposed functions, procedures, and/or methods.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The RF unit may include a base-band circuit for processing a radio signal. When the embodiment of the present invention is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Although the aforementioned exemplary system has been described on the basis of a flowchart in which steps or blocks are listed in sequence, the steps of the present invention are not limited to a certain order. Therefore, a certain step may be performed in a different step or in a different order or concurrently with respect to that described above. Further, it will be understood by those ordinary skilled in the art that the steps of the flowcharts are not exclusive. Rather, another step may be included therein or one or more steps may be deleted within the scope of the present invention.

What is claimed is:

1. A method of performing power control for uplink transmission in a user equipment, the method comprising:
   receiving a signal containing information about a maximum modulation order among modulation schemes of which an order is lower than an order of a first reference modulation scheme among modulation schemes that can be used for uplink transmission;
   comparing the modulation order set to be used for the uplink transmission with the modulation order contained in the signal;
   if the modulation order set to be used for the uplink transmission is lower than or equal to the modulation order contained in the signal, setting a transmission radio frequency (RF) unit to a first power mode; and
   if the modulation order set to be used for the uplink transmission is greater than the modulation order contained in the signal, setting the transmitting RF unit to a second power mode,
   wherein the first power mode is a mode in which a high error vector magnitude (EVM) is allowed and power consumption is low, and
   wherein the second power mode is a mode in which a low EVM is necessary and great power consumption is necessary.

2. The method of claim 1, wherein the information regarding the maximum modulation order is common to all user equipments in a cell, or is different for each user equipment.

3. The method of claim 1, wherein the information regarding the maximum modulation order has a 2-bit length, and indicates QPSK if a bit value is 00, 16QAM if the value is 01, 64QAM if the value is 10, and 256QAM if the value is 11.

4. A user equipment for performing power control for uplink transmission, the user equipment comprising:
   a radio frequency (RF) unit set to any one of a first power mode and a second power mode, and
   a processor that is configured to perform:
   receiving a signal containing information through the RF unit about a maximum modulation order among modulation schemes of which an order is lower than an order of a first reference modulation scheme among modulation schemes that can be used for uplink transmission, comparing the modulation order set to be used for the uplink transmission with the modulation order contained in the signal, if the modulation order set to be used for the uplink transmission is lower than or equal to the modulation order contained in the signal, setting a transmission RF unit to a first power mode; and if the modulation order set to be used for the uplink transmission is greater than the modulation order contained in the signal, the processor sets a transmitting end of the RF unit to a second power mode, wherein the first power mode is a mode in which a high error vector magnitude (EVM) is allowed and power consumption is low, and wherein the second power mode is a mode in which a low EVM is necessary and great power consumption is necessary.

5. The user equipment of claim 4, wherein the information regarding the maximum modulation order is common to all user equipments in a cell, or is different for each user equipment.

6. The user equipment of claim 4, wherein the information regarding the maximum modulation order has a 2-bit length, and indicates QPSK if a bit value is 00, 16QAM if the value is 01, 64QAM if the value is 10, and 256QAM if the value is 11.

* * * * *